US010336319B2

(12) United States Patent
Qian et al.

(10) Patent No.: US 10,336,319 B2
(45) Date of Patent: Jul. 2, 2019

(54) METHOD, DEVICE AND COMPUTER-READABLE STORAGE MEDIUM FOR PARKING A SELF-BALANCING VEHICLE

(71) Applicant: Beijing Xiaomi Mobile Software Co., Ltd., Beijing (CN)

(72) Inventors: Zhuang Qian, Beijing (CN); Lifei Xiang, Beijing (CN); Baoke Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 195 days.

(21) Appl. No.: 15/341,913

(22) Filed: Nov. 2, 2016

(65) Prior Publication Data
US 2017/0282913 A1    Oct. 5, 2017

(30) Foreign Application Priority Data

Mar. 29, 2016 (CN) .......................... 2016 1 0187664

(51) Int. Cl.
*B60W 30/06* (2006.01)
*G05D 1/08* (2006.01)
(Continued)

(52) U.S. Cl.
CPC .......... *B60W 30/06* (2013.01); *B60W 30/143* (2013.01); *B62D 15/027* (2013.01); *B62D 15/0285* (2013.01); *G05D 1/0212* (2013.01); *G05D 1/0238* (2013.01); *G05D 1/0891* (2013.01); *G06K 9/00812* (2013.01);
(Continued)

(58) Field of Classification Search
CPC ..... B60W 30/06; B60W 30/14; B62D 15/027; B62D 15/0285; B62K 11/007; G08G 1/143; G08G 1/168; G08G 1/16; G05D 1/08; G05D 1/02
See application file for complete search history.

(56) References Cited

U.S. PATENT DOCUMENTS 7,953,526 B2 * 5/2011 Durkos ................ G05D 1/0246
340/286.02
2004/0006422 A1 * 1/2004 Fehr ........................ G01C 21/20
701/23
(Continued)

FOREIGN PATENT DOCUMENTS

CN          1605832 A      4/2005
CN        102110376 A      6/2011
(Continued)

OTHER PUBLICATIONS

DE102007038243 translation.*
(Continued)

*Primary Examiner* — Kira Nguyen
(74) *Attorney, Agent, or Firm* — Arch & Lake LLP

(57) ABSTRACT

A method, device and computer-readable storage medium are provided for parking a self-balancing vehicle. The method includes: determining whether there is a target parking spot for parking a self-balancing vehicle when the self-balancing vehicle needs to be parked; controlling, when there is a target parking spot for parking the self-balancing vehicle, the self-balancing vehicle to park at the target parking spot.

17 Claims, 7 Drawing Sheets

(51) Int. Cl.
  *B62D 15/02* (2006.01)
  *B60W 30/14* (2006.01)
  *G05D 1/02* (2006.01)
  *G08G 1/16* (2006.01)
  *G06K 9/00* (2006.01)
  *B62K 11/00* (2006.01)
  *G08G 1/14* (2006.01)

(52) U.S. Cl.
  CPC ......... *G08G 1/168* (2013.01); *B60W 2420/42* (2013.01); *B60W 2550/10* (2013.01); *B60W 2720/00* (2013.01); *B60W 2720/10* (2013.01); *B62K 11/007* (2016.11); *G08G 1/143* (2013.01)

(56) References Cited

U.S. PATENT DOCUMENTS

| | | | |
|---|---|---|---|
| 2005/0049767 A1* | 3/2005 | Endo | B62D 15/0285 701/36 |
| 2008/0027599 A1 | 1/2008 | Logan | |
| 2011/0209929 A1 | 9/2011 | Heinzmann et al. | |
| 2015/0241230 A1 | 8/2015 | Davidson | |
| 2017/0088134 A1 | 3/2017 | Liu | |

FOREIGN PATENT DOCUMENTS

| | | |
|---|---|---|
| CN | 102811901 A | 12/2012 |
| CN | 103903475 A | 7/2014 |
| CN | 203937671 U | 11/2014 |
| CN | 104249737 A | 12/2014 |
| CN | 104512394 A | 4/2015 |
| CN | 104943686 A | 9/2015 |
| CN | 105223952 A | 1/2016 |
| CN | 105280015 A | 1/2016 |
| CN | 205098363 U | 3/2016 |
| CN | 105810007 A | 7/2016 |
| DE | 102007038243 A1 | 6/2008 |

OTHER PUBLICATIONS

YouTube Video: GM/Segway Project P.U.M.A. Autonomous Operation—https://www.youtube.com/watch?v=hynbWQK-tAk.*
International Search report for international application No. PCT/CN2016/092113 dated Nov. 30, 2016, 13 pages.
Extended European Search Report for Application No. 16196306.1 dated May 12, 2017, 6 pages.
First Office Action (including English translation) issued in corresponding Chinese Patent Application No. 201610187664.2, dated Dec. 4, 2017, 22 pages.
Summons to Attend Oral Proceedings issued in EP Application No. 16196306.1, on Jan. 28, 2019, 6 pages.
Chinese Third Office Action (including English translation) issued in CN Application No. 201610187664.2, dated Apr. 1, 2019, 30 pages.
Chinese Second Office Action (including English translation) issued in CN Application No. 201610187664.2, dated Sep. 4, 2018, 10 pages.

* cited by examiner

METHOD, DEVICE AND COMPUTER-READABLE STORAGE MEDIUM FOR PARKING A SELF-BALANCING VEHICLE

CROSS-REFERENCE TO RELATED APPLICATION

This application bases on and claims priority to Chinese Patent Application No. 201610187664.2, filed Mar. 29, 2016, which is incorporated herein by reference in its entirety.

TECHNICAL FIELD

The present disclosure relates to the technical field of intelligent transportation, and more particularly, to a method, device and computer-readable storage medium for parking a self-balancing vehicle.

BACKGROUND

Self-balancing vehicle is a new kind of short-distance transportation, which can make use of an electric motor and sensors to realize self-balancing and going forward/backward as well as steering, and can be automatically turned off when not in use for a period of time in order to keep power from being consumed. If a self-balancing vehicle has not leaned against an object in process of automatic turn-off, it will fall to ground due to loss of self-balancing, which may cause physical damage to the self-balancing vehicle.

In the related art, a self-balancing vehicle can emit sound or light or other warning signals in process of automatic turn-off in order to warn persons nearby of the turn-off, and thereby the persons warned will take the self-balancing vehicle in a right place manually. Since the sound or light or other warning signals emitted by the self-balancing vehicle may disturb other persons around and the emitted sound may even lead to noise pollution when the self-balancing vehicle is in a smaller space, user experience is thus poor. In addition, parking of the self-balancing vehicle requires human's participation, so if nobody is in an area within a preset distance from current position of the self-balancing vehicle or the persons warned may not get to the position of the self-balancing vehicle in time, then the self-balancing vehicle still may fall to the ground.

SUMMARY

In view of the fact in related arts, the embodiments in the present disclosure provide a method, device, and computer-readable storage medium for parking a self-balancing vehicle, which enables automatic movement of the self-balancing vehicle to a parking spot to achieve parking.

According to a first aspect of the present disclosure, a method for parking a self-balancing vehicle is provided. The method may include: determining whether there is a target parking spot for parking the self-balancing vehicle when the self-balancing vehicle needs to be parked; and controlling, when there is a target parking spot for parking the self-balancing vehicle, the self-balancing vehicle to park at the target parking spot.

According to a second aspect of the present disclosure, a device for parking a self-balancing vehicle is provided. The device may include: a first determination module configured to determine whether there is a target parking spot for parking the self-balancing vehicle exists when the self-balancing vehicle needs to be parked; a control module configured to control, when the first determination module determines that there is a target parking spot for parking the self-balancing vehicle, the self-balancing vehicle to park at the target parking spot.

According to a third aspect of the present disclosure, a device for controlling parking of a self-balancing vehicle is provided. The device includes: a processor; a storage for storing instructions, which are executable by the processor; wherein, the processor is configured to: determine whether there is a target parking spot for parking the self-balancing vehicle when the self-balancing vehicle needs to be parked; control, when there is a target parking spot for parking the self-balancing vehicle, the self-balancing vehicle to park at the target parking spot.

According to a fourth aspect of the present disclosure, there is provided a non-transitory computer-readable storage medium having stored therein instructions that, when executed by a processor, causes the processor to perform a method for parking a self-balancing vehicle, the method comprising: determining whether there is a target parking spot for parking the self-balancing vehicle when the self-balancing vehicle needs to be parked; and controlling, when there is a target parking spot for parking the self-balancing vehicle, the self-balancing vehicle to park at the target parking spot.

It is to be understood that both the forgoing general descriptions and the following detailed descriptions are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1:
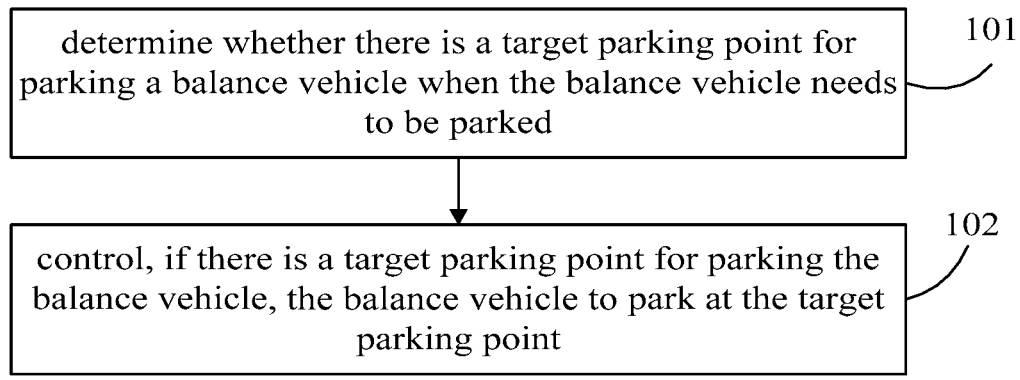
FIG. 1 is a flow chart showing a method for parking a self-balancing vehicle according to an exemplary embodiment.

FIG. 1 is a flow chart showing a method for parking a self-balancing vehicle according to an exemplary embodiment. The method for parking a self-balancing vehicle can be applied to a self-balancing vehicle. As shown in FIG. 1, the method for parking a self-balancing vehicle includes the following steps.

In step 101, a determination as to whether there is a target parking spot for parking the self-balancing vehicle is made when the self-balancing vehicle needs to be parked. The self-balancing vehicle may determine that it needs to be parked when receiving a parking instruction from a connected smart device, when a self-parking button is pressed, when an off-switch is triggered, or when receiving other preset parking instructions.

For example, when an off switch in the self-balancing vehicle is triggered, the self-balancing vehicle may first determine whether there is a target parking spot for parking the self-balancing vehicle in order to prevent the self-balancing vehicle from falling to the ground.

In one or more embodiments, a distance sensor of the self-balancing vehicle can be used to determine whether there is a target parking spot for parking the self-balancing vehicle in an area within a set distance from a current position of the self-balancing vehicle. In another embodiment, a camera device provided on the self-balancing vehicle, such as a camera (wherein, the camera is rotatable within a preset angle range), can be used to determine whether there is a target parking spot for parking the self-balancing vehicle. In a further embodiment, a body motor of the self-balancing vehicle can be used for searching for an obstacle by a touch test, and if, when the driving speed of the self-balancing vehicle exceeds a preset speed threshold, the self-balancing vehicle is still not able to go over the obstacle, then the obstacle can be determined as the target parking spot. The way of determining a target parking spot by using the distance sensor, camera device and body motor can be obtained from the embodiments shown in FIGS. 2-4, and thus is not described here in detail.

In step 102, in the case that there is a target parking spot for parking the self-balancing vehicle, the self-balancing vehicle is controlled to park at the target parking spot.

For example, the self-balancing vehicle can be controlled to be driven in a direction toward the target parking spot sensed by the distance sensor to the target parking spot. In another embodiment, a driving route, along which the self-balancing vehicle will be driven from the current position to the target parking spot, can be determined according to images captured by the camera device, and then the self-balancing vehicle can be controlled to be driven along the driving route to the target parking spot. In a further embodiment, if the self-balancing vehicle is blocked by an obstacle during movement within a preset area and it is determined that the self-balancing vehicle is not able to go over the obstacle, it can be determined that the self-balancing vehicle has reached the target parking spot.

In one or more embodiments, when the self-balancing vehicle needs to be parked, the self-balancing vehicle can automatically determine whether there is a target parking spot for parking the self-balancing vehicle in an area within a set distance from the current position, and then parks at the target parking spot, which can solves an problem in related art that parking of a self-balancing vehicle requires human's participation, thus user experience of using the self-balancing vehicle can be improved.

Here, the determination as to whether there is a target parking spot for parking the self-balancing vehicle may include: determining, by a distance sensor of the self-balancing vehicle, whether there is a reference parking spot for parking the self-balancing vehicle in an area within a set distance from the current position; determining, if it is determined by the distance sensor that there is a reference parking spot for parking the self-balancing vehicle, whether a distance between the current position and a position of the reference parking spot is less than a preset distance threshold; and determining the reference parking spot as the target parking spot if it is determined that the distance is less than the preset distance threshold.

In one or more embodiments, the determination as to whether the distance between the current position and the position of the reference parking spot is less than the preset distance threshold may include: determining, in the case where it is determined by the distance sensor that there are two or more reference parking spots, distances between the self-balancing vehicle and the two or more reference parking spots, respectively; and determining whether a minimum distance among the distances for the two or more reference parking spots is less than the preset distance threshold.

For example, controlling the self-balancing vehicle to park at the target parking spot may include: determining, by a distance sensor of the self-balancing vehicle, a driving direction of the self-balancing vehicle; and controlling the self-balancing vehicle to be driven in the driving direction to the target parking spot.

In one or more embodiments, the determination as to whether there is a target parking spot for parking the self-balancing vehicle may include: controlling a camera device of the self-balancing vehicle to be rotated within a preset angle range to capture images; and determining that there is a target parking spot for parking the self-balancing vehicle if there shows a parking spot for parking the self-balancing vehicle in the images captured by the camera device.

Alternatively or additionally, the method may further include: determining whether there are two or more parking spots for parking the self-balancing vehicle according to the images captured by the camera device during rotation within a preset angle range; calculating, if there are two or more parking spots, complexities of driving routes along which the self-balancing vehicle would be driven from the current position to the two or more parking spots, respectively; and determining, according to the complexities of the driving routes for the two or more parking spots, a parking spot which corresponds to a minimum complexity among the complexities as the target parking spot for parking the self-balancing vehicle.

In this disclosure, the controlling the self-balancing vehicle to park at the target parking spot may include: controlling the self-balancing vehicle to be driven along the driving route to the target parking spot to park.

In one or more embodiments, the determination as to whether there is a target parking spot for parking the self-balancing vehicle may include: controlling a body motor of the self-balancing vehicle to drive the self-balancing vehicle to move within a preset area at a preset speed; controlling the self-balancing vehicle in a preset speed increase manner such that the speed of the self-balancing vehicle is increased to a preset speed threshold if the self-balancing vehicle detects an obstacle during movement within the preset area; determining whether the self-balancing vehicle is able to go over the obstacle if it moves at a preset speed threshold; and determining the obstacle as the target parking spot for parking the self-balancing vehicle if it is determined that the self-balancing vehicle is not able to go over the obstacle.

In one or more embodiments, the method may further include: determining whether the self-balancing vehicle reaches the target parking spot; determining, by a balance device of the self-balancing vehicle, whether gravity center of the self-balancing vehicle has leaned against the target parking spot upon determination that the self-balancing vehicle reaches the target parking spot; and controlling the self-balancing vehicle to perform a posture adjustment if the gravity center of the self-balancing vehicle has not leaned against the target parking spot, and stopping the posture adjustment when the gravity center of the self-balancing vehicle leans against the target parking spot such that the self-balancing vehicle parks at the target parking spot.

Regarding details about how to park a self-balancing vehicle, please see the following descriptions.

So far, the above method provided by the present disclosure can achieve automatic parking of a self-balancing vehicle, which can solve an problem in related art that parking a self-balancing vehicle requires human's participation, and thus user experience of using the self-balancing vehicle can be improved.

The following particular embodiments are provided to illustrate the technical solutions of the embodiments of the present disclosure.

Figure 2:
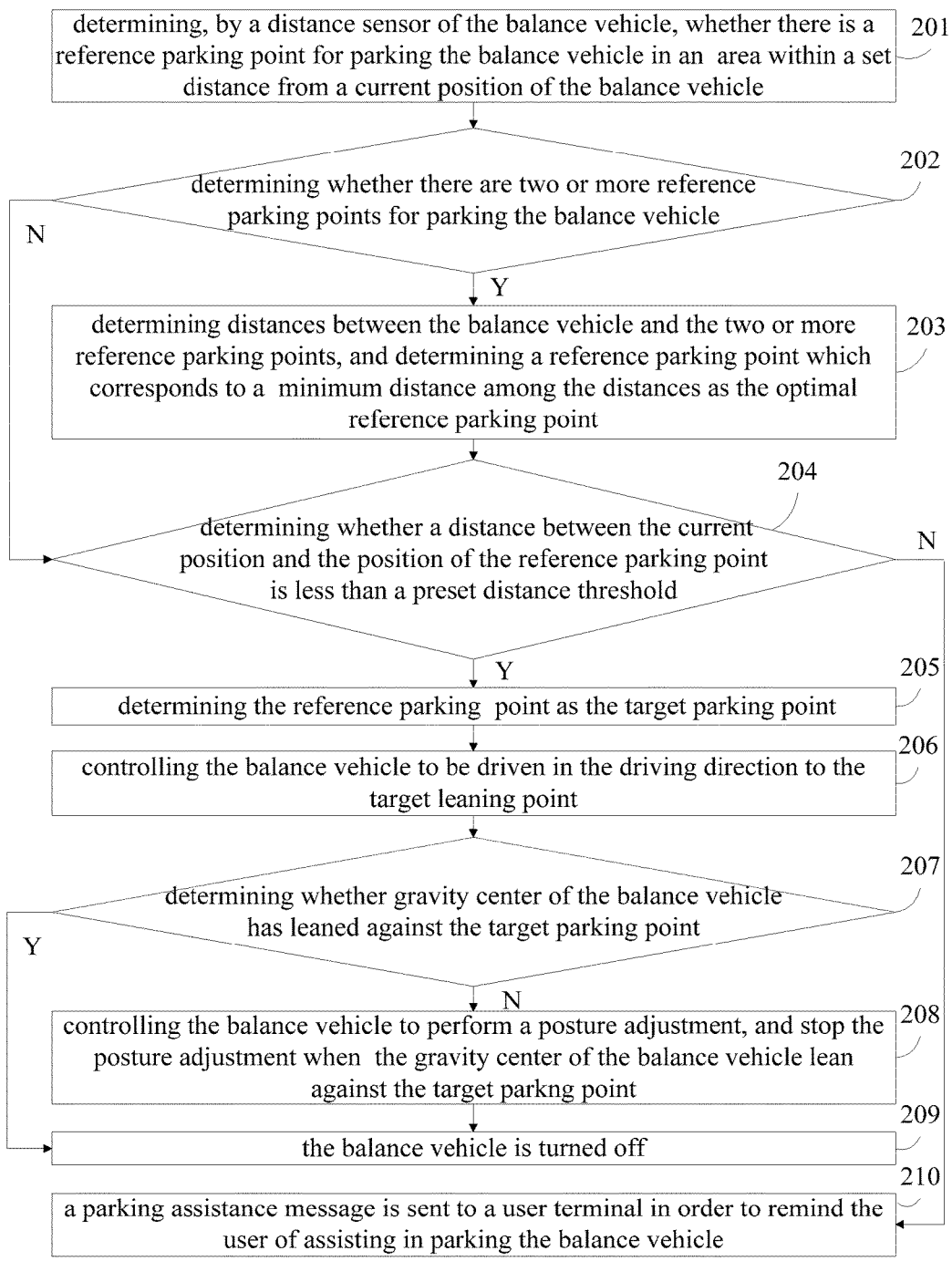
FIG. 2 is a flow chart showing a method for parking a self-balancing vehicle according to an exemplary embodiment 1.

FIG. 2 is a flow chart showing a method for parking a self-balancing vehicle according to an exemplary embodiment 1. The embodiment utilizes the above method provided according to the embodiments of the present disclosure, and will be described by using an example, in which a distance sensor of the self-balancing vehicle is used to achieve parking of the self-balancing vehicle. As shown in FIG. 2, the method includes the following steps.

In step 201, a distance sensor of the self-balancing vehicle is used to determine whether there is a reference parking spot for parking the self-balancing vehicle in an area within a set distance from a current position of the self-balancing vehicle.

In this disclosure, the self-balancing vehicle may be provided with a plurality of distance sensors, of which one distance sensor can be used to determine whether there is a reference parking spot in a certain direction or a range of directions. For example, the self-balancing vehicle may be provided with two distance sensors, which are used to determine whether there is a reference parking spot in a forward direction and a backward direction, respectively.

In this disclosure, the reference parking spot mentioned in the present disclosure may be a position of a target object against which the self-balancing vehicle can lean. In this disclosure, the target object maybe a wall, or may be a fixed-position object, such as a cabinet, or may be other objects for parking a self-balancing vehicle, which are temporarily fixed in position.

In step 202, a determination as to whether there are two or more reference parking spots for parking the self-balancing vehicle is made. If it is determined that there are two or more reference parking spots, then the flow goes to step 203, and if there is only one reference parking spot, then the flow goes to step 204.

In this disclosure, the distance sensor in the self-balancing vehicle may sense a plurality of reference parking spots. For example, the distance sensor may determine there is a reference parking spot at a position 3 meters away from the current position in the forward direction and there is a reference parking spot at a position 4 meters away from the current position in the backward direction.

In step 203, distances between the self-balancing vehicle and the two or more reference parking spots are determined respectively, and a reference parking spot which corresponds to a minimum value among the distances, is determined as the optimal reference parking spot. Then, the flow goes to step 204.

For example, in the case where the distance sensor determines that there is a reference parking spot at a position 3 meters away in the forward direction and there is a reference parking spot at a position 4 meters away in the backward direction, it can be determined that the reference parking spot at the position 3 meters away in the forward direction is the optimal reference parking spot. The distance between the optimal reference parking spot and the self-balancing vehicle is compared with a preset distance threshold, in order to determine whether the optimal reference parking spot can be used for parking the self-balancing vehicle.

In step 204, a determination as to whether the distance between the current position and the position of the reference parking spot is less than a preset distance threshold is made. If the distance is less than the preset distance threshold, then the flow goes to step 205, otherwise goes to step 210.

In this disclosure, the preset distance threshold may be obtained by recording different distances between the self-balancing vehicle and different parking spots within a certain number of parking operations for test (for example, 30 times) since a corresponding automatic parking application is installed by a user in the self-balancing vehicle and determining a distance by which the self-balancing vehicle can be successfully parked, and then the preset distance threshold may be stored in the self-balancing vehicle.

In this disclosure, the preset distance threshold may be a default value stored in the corresponding automatic parking application, which was installed by the user.

In step 205, the reference parking spot is determined as the target parking spot.

In step 206, the self-balancing vehicle is controlled to be driven in a driving direction determined by the distance sensor to the target parking spot.

For example, if it is determined that the target parking spot is positioned in front of right side of the current position, then it can be determined that the driving direction of the self-balancing vehicle is in front-right direction, and the self-balancing vehicle will be controlled to be driven in the front-right direction to the target parking spot.

In step 207, upon determination that the self-balancing vehicle reaches the target parking spot, a determination as to whether gravity center of the self-balancing vehicle has leaned against the target parking spot is made by using a balance device of the self-balancing vehicle. The balance device may include at least one sensor and other circuitries to detect the balance state of the self-balancing vehicle. If the gravity center of the self-balancing vehicle leans against the target parking spot, then the flow goes to step 209, while if the gravity center of the self-balancing vehicle has not leaned against the target parking spot, then the flow goes to step 208.

In step 208, the self-balancing vehicle is controlled to perform a posture adjustment, and the posture adjustment will be stopped upon the gravity center of the self-balancing vehicle leans against the target parking spot, after which the flow goes to step 209.

In this disclosure, the determination as to whether the gravity center of the self-balancing vehicle leans against the target parking spot may be made and the posture adjustment may be performed by using a balance device of the self-balancing vehicle.

In step 209, the self-balancing vehicle is turned off.

In step 210, a park assistance message is sent to a user terminal, in order to remind the user of assisting in parking of the self-balancing vehicle.

In this disclosure, the self-balancing vehicle may also emit sound or light or other warning signals, in order to warn persons nearby of parking the self-balancing vehicle manually.

In this embodiment, by determining, using a distance sensor of the self-balancing vehicle, whether there is a reference parking spot for parking the self-balancing vehicle in an area within a set distance from a current position of the self-balancing vehicle, a distance of a nearest parking spot in the area from the current position can be exactly determined, and used for determining whether to control the self-balancing vehicle to park at this spot, which enhances probability of successful parking of the self-balancing vehicle.

Figure 3:
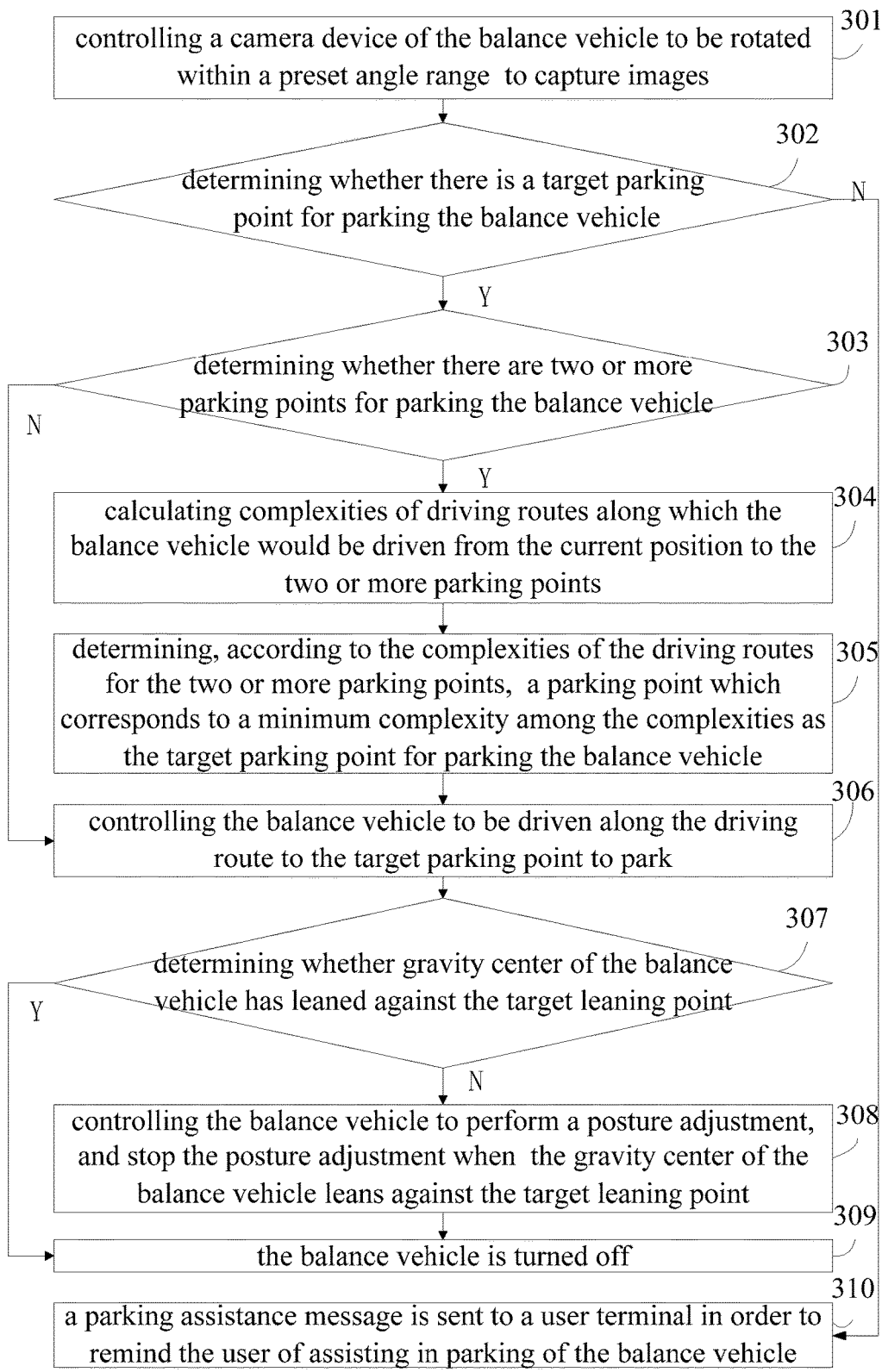
FIG. 3 is a flow chart showing a method for parking a self-balancing vehicle according to an exemplary embodiment 2.

FIG. 3 is a flow chart showing a method for parking a self-balancing vehicle according to an exemplary embodiment 2. The embodiment will be schematically described by using an example in which a camera device of the self-balancing vehicle is used for achieving parking of a self-balancing vehicle. As shown in FIG. 3, the method includes the following steps.

In step 301, the camera device of the self-balancing vehicle is controlled to be rotated within a preset angle range to capture images.

In this disclosure, the camera device of the self-balancing vehicle is rotatable within a preset angle range, and can capture images during the rotation. For example, in the case that the camera device of the self-balancing vehicle is rotatable in an angle range of 360°, then parking spots for parking the self-balancing vehicle can be found out during rotation of the camera device within 360°.

In step 302, a determination as to whether there is a target parking spot for parking the self-balancing vehicle is made according to the images captured by the camera device during rotation within the preset angle range. If it is determined that there is a target parking spot for parking the self-balancing vehicle, the flow goes to step 303, otherwise goes to step 310.

In step 303, a determination as to whether there are two or more parking spots for parking the self-balancing vehicle is made according to the captured images during rotation of the camera device within the preset angle range. If it is determined that there are two or more parking spots for the self-balancing vehicle, then the flow goes to step 304, otherwise goes to step 306.

In step 304, complexities of driving routes along which the self-balancing vehicle would be driven from the current position to the two or more parking spots are calculated, respectively.

In step 305, according to the complexities of the driving routes for the two or more parking spots, a parking spot which corresponds to a minimum value among the complexities is determined as the target parking spot for parking the self-balancing vehicle.

In this disclosure, a parking spot, which corresponds to a minimum value among the complexities, can be determined as a parking spot for easier parking of the self-balancing vehicle, and therefore, the parking spot with the minimum complexity can be determined as the target parking spot. For example, in the case where a driving route, along which the self-balancing vehicle will be driven to a parking spot A, is "drive forward 3 meters, turn left 90°, then drive 2 meters", which has a complexity of 0.6, and another driving route, along which the self-balancing vehicle will be driven to another parking spot B, is "drive forward 4 meters", which has a complexity of 0.3, the parking spot B will be determined as the target parking spot.

In another embodiment, the target parking spot may also be determined according to reliability of a target object at which a parking spot is positioned. For example, in the case where two parking spots are determined according to the captured images, and one of them is a parking spot on a wall, and the other one is a parking spot on a pillar in a hall, the parking spot on the wall can be selected as the target parking spot for the self-balancing vehicle because the parking spot on the wall may cause less negative effects on the user's daily life, while the pillar in the hall may easily block a user's movement if the user passes through. The level of reliability of a parking spot may be preset by a user based on an empirical value.

In this disclosure, reliability of a reference parking spot may be applied a certain weight when complexities for respective parking spots are calculated. The particular value of the weight can be preset by a user based on an empirical value. For example, in the case where the driving route, along which the self-balancing vehicle will be driven to a parking spot A, is "drive forward 3 meters, turn left 90°, then go ahead 2 meters", which has a complexity of 0.6, and the parking spot is a wall, which has a reliability of 0.8, while another driving route, along which the self-balancing vehicle will be driven to another parking spot B, is "drive forward 4 meters", which has a complexity of 0.3, and the parking spot is on a cabinet, which has a reliability 0.6, if each reliability is applied with a weight of −0.2, then the complexity for the parking spot A is 0.6+(−0.2)*0.8=0.44, and the complexity for the parking spot B is 0.3+(−0.2)*0.6=0.18, and hence it can be determined that the parking spot B is the target parking spot.

In step 306, the self-balancing vehicle is controlled to be driven along the driving route to the target parking spot to park.

In step 307, a determination as to whether gravity center of the self-balancing vehicle leans against the target parking spot by using a balance device of the self-balancing vehicle, when it is determined that the self-balancing vehicle reaches the target parking spot.

In step 308, the self-balancing vehicle is controlled to perform a posture adjustment and stop the posture adjustment when the gravity center of the self-balancing vehicle leans against the target parking spot. Then, the flow goes to step 309.

In step 309, the self-balancing vehicle is turned off.

In step 310, a park assistance message is sent to the user terminal, in order to remind the user of assisting in parking of the self-balancing vehicle.

In this disclosure, the self-balancing vehicle may also emit sound or light or other warning signals, in order to warn persons nearby of parking the self-balancing vehicle manually.

In this embodiment, by controlling a camera device of the self-balancing vehicle to be rotated within a preset angle range, all the parking spots, which are in the area covered by images captured by the camera device during rotation, can be determined according to the captured images, and then a parking spot, which is the nearest and most convenient for parking of the self-balancing vehicle, can be determined through image processing.

Figure 4:
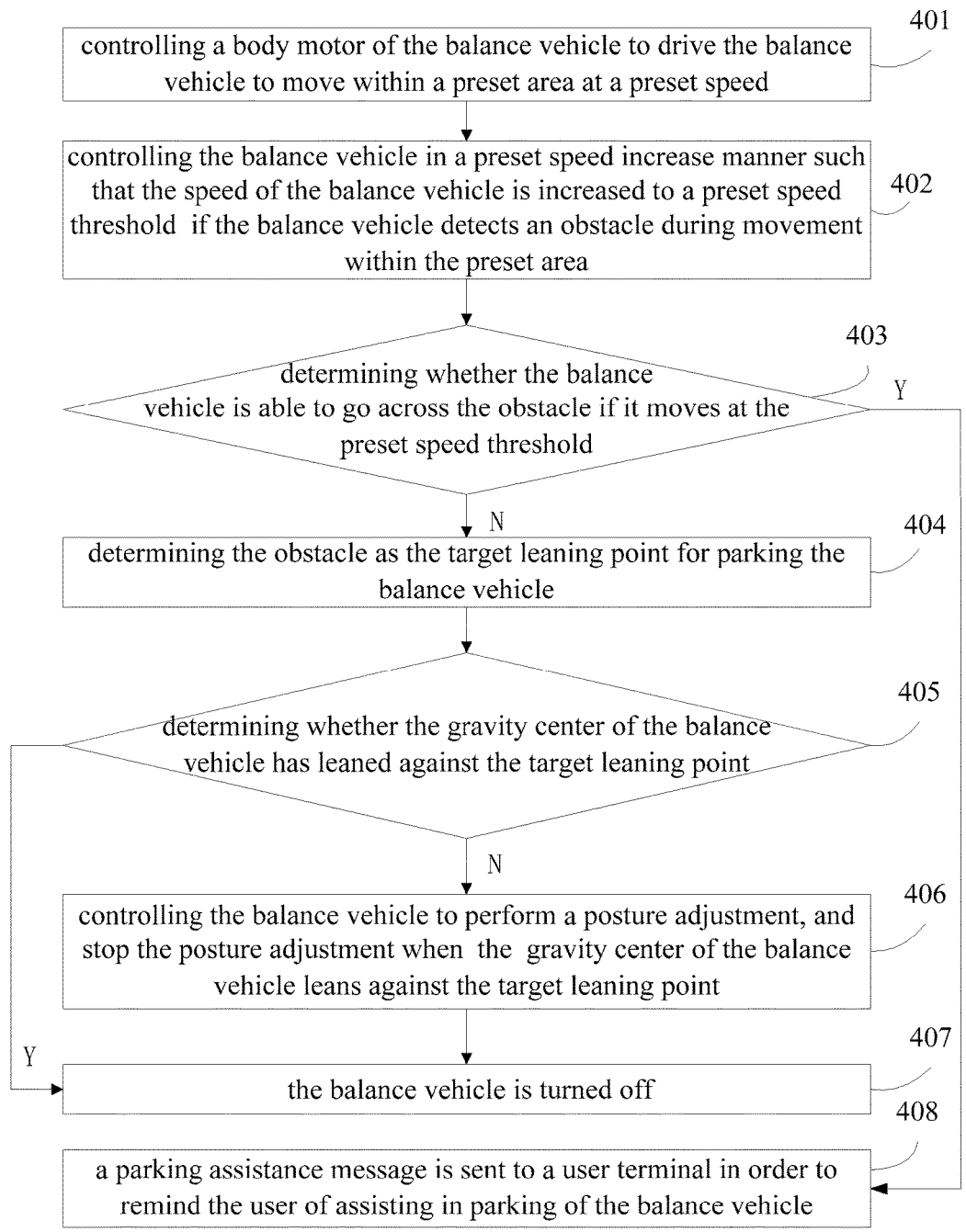
FIG. 4 is a flow chart showing a method for parking a self-balancing vehicle according to an exemplary embodiment 3.

FIG. 4 is a flow chart showing a method for parking a self-balancing vehicle according to an exemplary embodiment 3. The embodiment will be schematically described by using an example, in which a body motor of the self-balancing vehicle is used to drive the self-balancing vehicle to move within a preset area so as to achieve parking of the self-balancing vehicle. As shown in FIG. 4, the method includes the following steps.

In step 401, the body motor of the self-balancing vehicle is controlled to drive the self-balancing vehicle to move within a preset area at a preset speed.

In this disclosure, the body motor of the self-balancing vehicle can be controlled to drive the self-balancing vehicle to move around within a preset area at a relative slower speed, by which a touch test during the movement can be performed to determine whether there is a parking spot. In this disclosure, the preset area may be a relative smaller area. For example, the touch test may be conducted in an area within 1 to 100 cm from the current position.

In step 402, the self-balancing vehicle is controlled in a preset speed increase manner such that the speed of the self-balancing vehicle is increased to a preset speed threshold if the self-balancing vehicle detects an obstacle during movement within the preset area.

In this disclosure, the preset speed increase manner may be increase gradually. For example, the speed can be increased by 3 m/s firstly, then the self-balancing vehicle moves forward at the increased speed, and if it still cannot able to go over an obstacle, the increased speed is increased by 2 m/s, and so on. The increment of speed for each time may be same, or may be smaller and smaller.

In this disclosure, the preset speed threshold may be a speed value set by the user based on an empirical value. If the preset speed threshold is exceeded, it is possible that the self-balancing vehicle will be damaged. Therefore, the preset speed threshold can be stored in the self-balancing vehicle.

In step 403, a determination as to whether the self-balancing vehicle is able to go over the obstacle if it moves at the preset speed threshold. If the self-balancing vehicle is able to go over the obstacle, then the flow goes to step 408, but if the self-balancing vehicle is not able to go over the obstacle, then the flow goes to step 404.

In step 404, the obstacle is determined as the target parking spot for parking the self-balancing vehicle.

In step 405, a determination as to whether gravity center of the self-balancing vehicle leans against the target parking spot by using a balance device of the self-balancing vehicle.

In step 406, the self-balancing vehicle is controlled to perform a posture adjustment, and stop the posture adjustment when the gravity center of the self-balancing vehicle leans against the target parking spot, after which the flow goes to step 407.

In step 407, the self-balancing vehicle is turned off.

In step 408, a parking assistance message is sent to the user terminal, in order to remind the user of assisting in parking of the self-balancing vehicle.

In this disclosure, the self-balancing vehicle may also emit sound or light or other warning signals, in order to warn persons nearby of parking the self-balancing vehicle manually.

In this embodiment, by controlling the body motor of the self-balancing vehicle to drive the self-balancing vehicle to move within a preset area at a preset speed, it can be determined whether there is a parking spot for parking the self-balancing vehicle within a smaller area in the area within a set distance from the current position, automatic parking of the self-balancing vehicle can be achieved without additional hardware supports, and thereby cost may be reduced.

It should be understood by those skilled in the art that, the technical solutions described with respect to FIG. 2, FIG. 3 and FIG. 4 of the present disclosure can be applied to a same device or a same self-balancing vehicle at the same time. The technical solutions can also be used in combination in order to achieve safe, automatic parking of a self-balancing vehicle.

Figure 5:
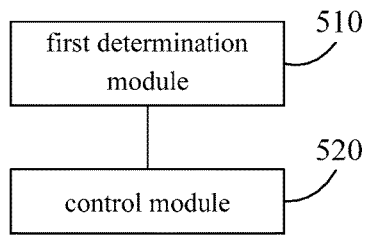
FIG. 5 is a block diagram illustrating a device for parking a self-balancing vehicle according to an exemplary embodiment.

FIG. 5 is a block diagram illustrating a device for parking a self-balancing vehicle according to an exemplary embodiment. As shown in FIG. 5, the device for parking a self-balancing vehicle includes: a first determination module 510, configured to determine whether there is a target parking spot for parking the self-balancing vehicle when the self-balancing vehicle needs to be parked; a control module 520, configured to control, if the first determination module 510 determines that there is a target parking spot for parking the self-balancing vehicle, the self-balancing vehicle to park at the target parking spot.

Figure 6:
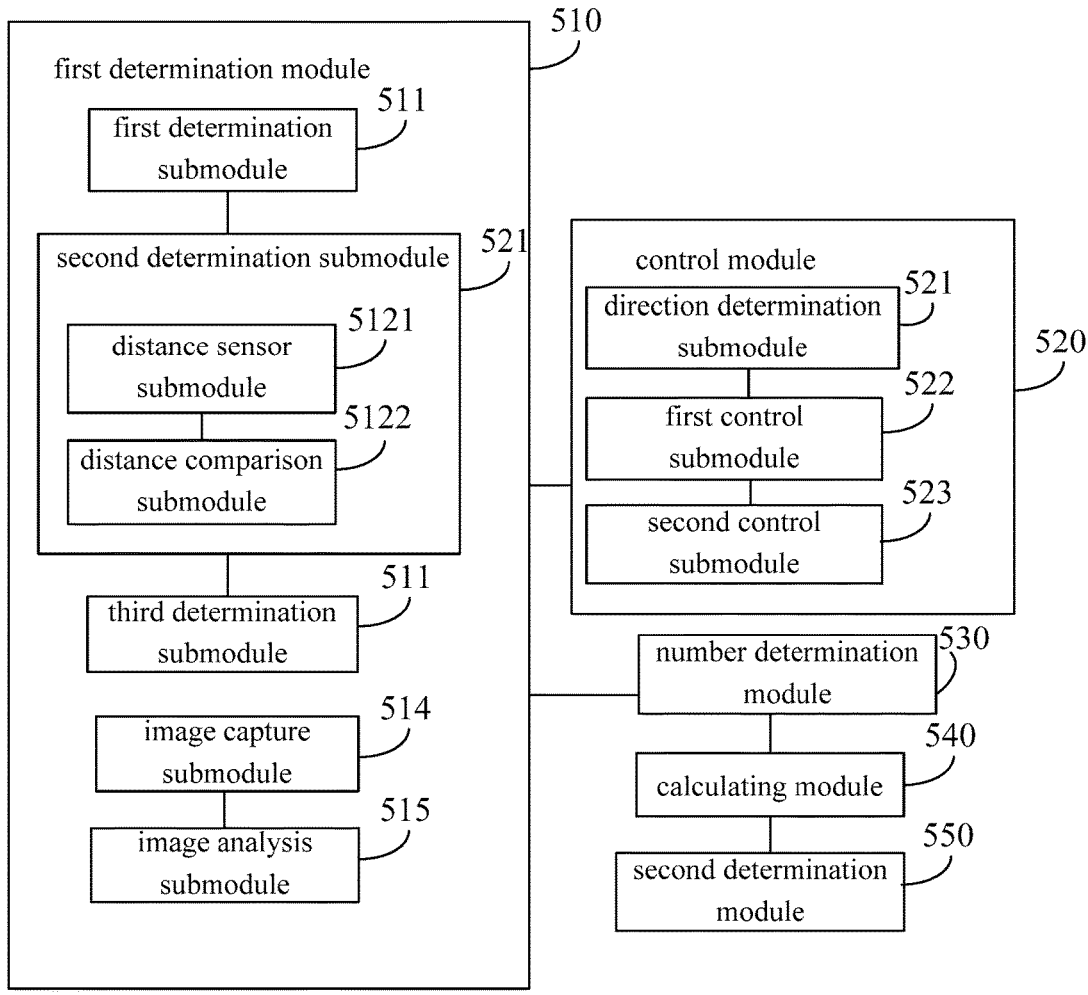
FIG. 6 is a block diagram illustrating another device for parking a self-balancing vehicle according to an exemplary embodiment.

FIG. 6 is a block diagram illustrating another device for parking a self-balancing vehicle according to an exemplary embodiment. As shown in FIG. 6, based on the embodiment shown in FIG. 5 above, in an embodiment, the first determination module 510 may include: a first determination submodule 511, configured to determine, by a distance sensor of the self-balancing vehicle, whether there is a reference parking spot for parking the self-balancing vehicle in an area within a set distance from the current position; a second determination submodule 512, configured to determine, if the first determination submodule 511 determines that there is a reference parking spot for parking self-balancing vehicle, whether a distance between the current position and the position of the reference parking spot is less than a preset distance threshold; a third determination submodule 513, configured to determine the reference parking spot as the target parking spot, if the second determination submodule 512 determines that the distance is less than the preset distance threshold.

In this disclosure, the second determination submodule 512 may include: a distance sensor submodule 5121, configured to determine, in the case where the first determination submodule 511 determines, using the distance sensor, that there are two or more reference parking spots, distances between the self-balancing vehicle and the two or more reference parking spots, respectively; a distance comparison submodule 5122, configured to determine whether a minimum distance among the distances for the two or more reference parking spots determined by the distance sensor submodule 5121 is less than the preset distance threshold.

In this disclosure, the control module 520 may include: a direction determination submodule 521, configured to determine, by using a distance sensor of the self-balancing vehicle, a driving direction of the self-balancing vehicle; a first control submodule 522, configured to control the self-balancing vehicle to be driven in the driving direction determined by direction determination submodule 521 to the target parking spot.

In this disclosure, the first determination module 510 may include: an image capture submodule 514, configured to control a camera device of the self-balancing vehicle to be rotated within a preset angle range to capture images; an image analysis submodule 515, configured to determine that there is a target parking spot for parking the self-balancing vehicle, if there shows a parking spot for parking the self-balancing vehicle in the images captured by the image capture submodule 514 using the camera device.

In this disclosure, the device may further include: a number determination module 530, configured to determine whether there are parking spots for parking the self-balancing vehicle, according to the images captured by the camera device during rotation within the preset angle range under control of the image capture submodule 514; a calculating module 540, configured to calculate, if the number determination module 530 determines that there are two or more parking spots, complexities of driving routes along which the self-balancing vehicle would be driven from the current position to the two or more parking spots, respectively; a second determination module 550, configured to determine, according to the complexities of driving routes for the two or more parking spots calculated by the calculating module 540, a parking spot which corresponds to a minimum value among the complexities as the target parking spot for parking the self-balancing vehicle.

In this disclosure, the control module 520 may include: a second control submodule 523, configured to control the self-balancing vehicle to be driven along the driving route to the target parking spot to park.

Figure 7:
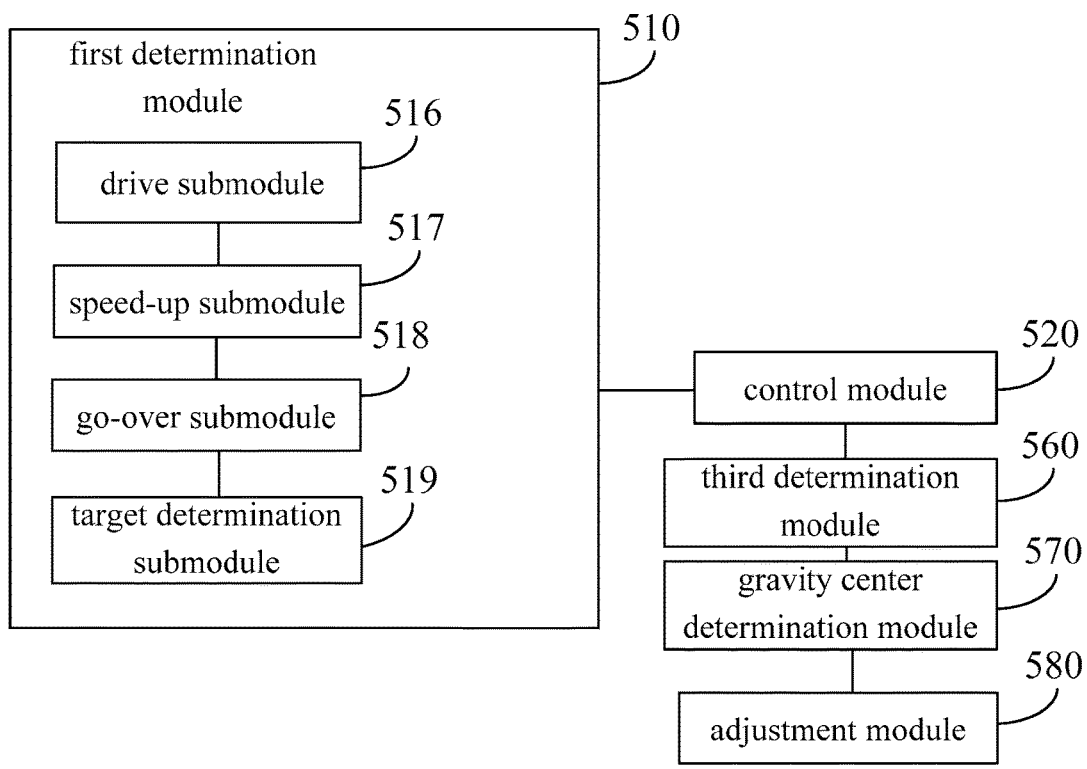
FIG. 7 is a block diagram illustrating yet another device for parking a self-balancing vehicle according to an exemplary embodiment.

FIG. 7 is a block diagram illustrating a further device for parking a self-balancing vehicle according to an exemplary embodiment. As shown in FIG. 7, based on the embodiments shown in FIG. 5 or FIG. 6 above, in an embodiment, the first determination module 510 may include: a drive submodule 516, configured to control a body motor of the self-balancing vehicle to drive the self-balancing vehicle to move within a preset area at a preset speed; a speed-up submodule 517, configured to control the self-balancing vehicle in a preset speed increase manner such that the speed of the self-balancing vehicle is increased to a preset speed threshold, an obstacle is detected during movement of the self-balancing vehicle within the preset area under control of the drive submodule 516; a go-over submodule 518, configured to determine whether the self-balancing vehicle is able to go over the obstacle if the self-balancing vehicle moves at the preset speed threshold to which the self-balancing vehicle is increased under control of the speed-up submodule 517; a target determination submodule 519, configured to determine the obstacle as the target parking spot for parking the self-balancing vehicle, if the go-over submodule 518 determines that the self-balancing vehicle is not able to go over the obstacle.

In this disclosure, the device may further include: a third determination module 560, configured to determine whether the self-balancing vehicle reaches the target parking spot; a gravity center determination module 570, configured to determine, by a balance device of the self-balancing vehicle, whether gravity center of the self-balancing vehicle leans against the target parking spot, when the third determination module 560 determines that the self-balancing vehicle reaches the target parking spot; an adjustment module 580, configured to control, if the gravity center determination module 570 determines that the gravity center of the self-balancing vehicle does not leans against the target parking spot, the self-balancing vehicle to perform a posture adjustment, and stop the posture adjustment when the gravity center of the self-balancing vehicle leans against the target parking spot such that the self-balancing vehicle parks at the target parking spot.

The implementation procedures of functions and features of respective modules of the device are same as those in respective steps of the above methods, and thus will be not repeated here.

For embodiments of a device, since it substantially corresponds to embodiments of a method, description of a certain part of the method may be referred to for description of a relevant part of the device. The above-described embodiments of a device are for illustrative purposes only, wherein elements described as separate components may or may not be physically separated, and components illustrated as elements may or may not be physical elements (i.e., these components may be located in the same place, or be distributed in several network elements). Part or all of the modules may be selected to realize the purposes of the scheme of this disclosure according to actual needs. Those of ordinary skill in the art may be able to understand and practice the scheme without creative efforts.

Figure 8:
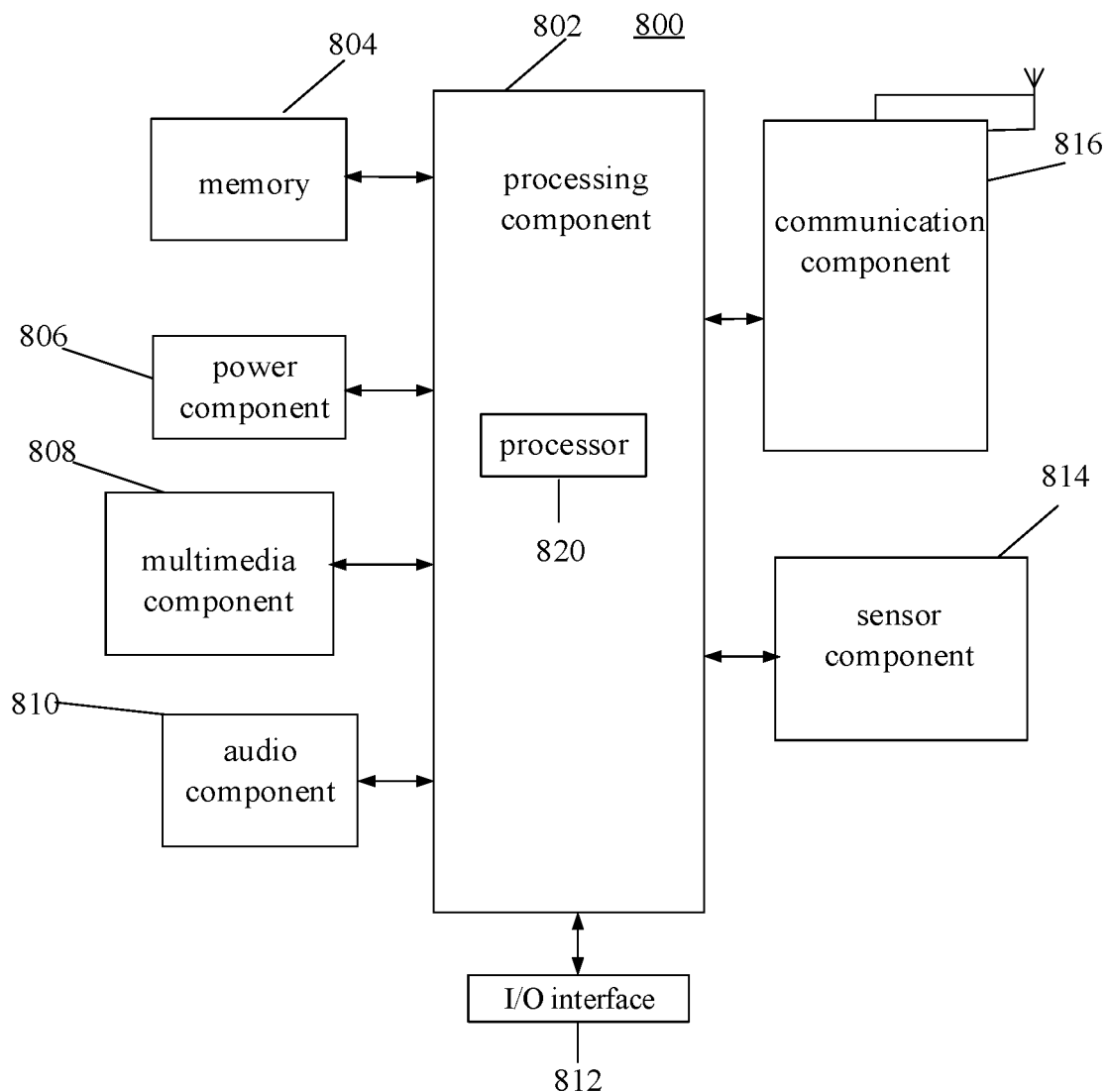
FIG. 8 is a block diagram applicable to a device for parking a self-balancing vehicle according to an exemplary embodiment.

FIG. 8 is a block diagram applicable to a device for parking a self-balancing vehicle according to an exemplary embodiment. For example, the device 800 may be a self-balancing vehicle, a smart device that may be plugged into the self-balancing vehicle directly, or a smart device that may communicate with the self-balancing vehicle via a wireless connection.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data may include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a distance sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, submodule, unit, or sub-unit in the disclosure may be implemented at least partially using the one or more circuitries.

In one or more embodiments, there is also provided a non-transitory computer-readable storage medium including instructions, such as the memory 804 including instructions executable by the processor 820 in the device 800 to perform the above-described methods. For example, the non-transitory computer-readable storage medium may be a ROM, a RAM, a CD-ROM, a magnetic tape, a floppy disc, an optical data storage device, and the like. Further, each module or submodule may include non-transitory memory (shared, dedicated, or group) that stores code or instructions that can be executed by one or more processors. The module or sub-module may take the form of a packaged functional hardware unit designed for use with other components, a portion of a program code (e.g., software or firmware) executable by the processing component 1202, one or more circuitries that usually perform a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for parking a self-balancing vehicle, comprising:
    determining whether there is a target parking spot for parking the self-balancing vehicle when the self-balancing vehicle needs to be parked; and
    when there is a target parking spot for parking the self-balancing vehicle, controlling the self-balancing vehicle to park at the target parking spot,
    wherein determining whether there is the target parking spot for parking the self-balancing vehicle comprises:
    controlling a body motor of the self-balancing vehicle to drive the self-balancing vehicle to move within a preset area at a preset speed;
    controlling the self-balancing vehicle in a preset speed increase manner such that the speed of the self-balancing vehicle is increased to a preset speed threshold if the self-balancing vehicle detects an obstacle during movement within the preset area;
    determining whether the self-balancing vehicle is able to go over the obstacle when it moves at the preset speed threshold; and
    determining the obstacle as the target parking spot for parking the self-balancing vehicle when it is determined that the self-balancing vehicle is not able to go over the obstacle.

2. The method of claim 1, wherein determining whether there is the target parking spot for parking the self-balancing vehicle comprises:
    determining, by a distance sensor of the self-balancing vehicle, whether there is a reference parking spot for parking the self-balancing vehicle in an area within a set distance from a current position of the self-balancing vehicle;
    determining, after it is determined by the distance sensor that there is the reference parking spot for parking self-balancing vehicle, whether a distance between the current position and a position of the reference parking spot is less than a preset distance threshold; and
    determining the reference parking spot as the target parking spot when it is determined that the distance is less than the preset distance threshold.

3. The method of claim 2, wherein determining whether the distance between the current position and the position of the reference parking spot is less than the preset distance threshold comprises:
    determining, when it is determined by the distance sensor that there are two or more reference parking spots, distances between the self-balancing vehicle and the two or more reference parking spots, respectively; and
    determining whether a minimum distance among the distances for the two or more reference parking spots is less than the preset distance threshold.

4. The method of claim 1, wherein controlling the self-balancing vehicle to park at the target parking spot comprises:
    determining, by a distance sensor of the self-balancing vehicle, a driving direction of the self-balancing vehicle; and
    controlling the self-balancing vehicle to be driven in the driving direction to the target parking spot.

5. The method of claim 1, wherein determining whether there is the target parking spot for parking the self-balancing vehicle comprises:
    controlling a camera device of the self-balancing vehicle to be rotated within a preset angle range to capture images; and
    determining that there is a target parking spot for parking the self-balancing vehicle if there shows a parking spot for parking the self-balancing vehicle in the images captured by the camera device.

6. The method of claim 5, further comprising:
    determining whether there are two or more parking spots for parking the self-balancing vehicle according to the images captured by the camera device during rotation within the preset angle range;
    calculating, when there are two or more parking spots, complexities of driving routes along which the self-balancing vehicle would be driven from a current position of the self-balancing vehicle to the two or more parking spots, respectively, wherein complexity of a driving route is a value calculated based on a length and corner condition of the driving route; and
    determining, according to the complexities of the driving routes for the two or more parking spots, a parking spot which corresponds to a minimum complexity among the complexities as the target parking spot for parking the self-balancing vehicle.

7. The method of claim 6, wherein controlling the self-balancing vehicle to park at the target parking spot comprises:
    controlling the self-balancing vehicle to be driven along a driving route having the minimum complexity to the target parking spot to park.

8. The method of claim 1, further comprising:
    determining whether the self-balancing vehicle reaches the target parking spot;
    determining, by a balance device of the self-balancing vehicle, whether gravity center of the self-balancing vehicle has leaned against the target parking spot upon determination that the self-balancing vehicle reaches the target parking spot; and
    controlling the self-balancing vehicle to perform a posture adjustment if the gravity center of the self-balancing vehicle has not leaned against the target parking spot, and stopping the posture adjustment when the gravity center of the self-balancing vehicle leans against the target parking spot such that the self-balancing vehicle parks at the target parking spot.

9. A device for parking a self-balancing vehicle, comprising:
- a processor;
- a storage for storing instructions, which are executable by the processor;
- wherein the processor is configured to:
  - determine whether there is a target parking spot for parking the self-balancing vehicle, when the self-balancing vehicle needs to be parked;
  - control, when there is a target parking spot for parking the self-balancing vehicle, the self-balancing vehicle to park at the target parking spot,
- wherein the processor is further configured to:
  - control a body motor of the self-balancing vehicle to drive the self-balancing vehicle to move within a preset area at a preset speed;
  - control the self-balancing vehicle in a preset speed increase manner such that the speed of the self-balancing vehicle is increased to a preset speed threshold if an obstacle is detected during movement of the self-balancing vehicle within the preset area;
  - determine whether the self-balancing vehicle is able to go over the obstacle when it moves at the preset speed threshold; and
  - determine the obstacle as the target parking spot for parking the self-balancing vehicle when it is determined that the self-balancing vehicle is not able to go over the obstacle.

10. The device of claim 9, wherein the processor is further configured to:
- determine, by a distance sensor of the self-balancing vehicle, whether there is a reference parking spot for parking the self-balancing vehicle in an area within a set distance from a current position of the self-balancing vehicle;
- determine, after it is determined that there is a reference parking spot for parking the self-balancing vehicle, whether a distance between the current position and a position of the reference parking spot is less than a preset distance threshold; and
- determine the reference parking spot as the target parking spot when it is determined that the distance is less than the preset distance threshold.

11. The device of claim 10, wherein the processor is further configured to:
- determine, by the distance sensor, when there are two or more reference parking spots, distances between the self-balancing vehicle and the two or more reference parking spots, respectively; and
- determine whether a minimum distance among the distances for the two or more reference parking spots is less than the preset distance threshold.

12. The device of claim 9, wherein the processor is further configured to:
- determine, by a distance sensor of the self-balancing vehicle, a driving direction of the self-balancing vehicle; and
- control the self-balancing vehicle to be driven in the driving direction to the target parking spot.

13. The device of claim 9, wherein the processor is further configured to:
- control a camera device of the self-balancing vehicle to be rotated within a preset angle range to capture images; and
- determine that there is a target parking spot for parking the self-balancing vehicle if there shows a parking spot for parking the self-balancing vehicle in the captured images.

14. The device of claim 13, wherein the processor is further configured to:
- determine whether there are two or more parking spots for parking the self-balancing vehicle according to the captured images;
- calculate, when it is determined that there are two or more parking spots, complexities of driving routes along which the self-balancing vehicle would be driven from a current position of the self-balancing vehicle to the two or more parking spots, respectively, wherein complexity of a driving route is a value calculated based on a length and corner condition of the driving route; and
- determine, according to the complexities of the driving routes for the two or more parking spots, a parking spot which corresponds to a minimum complexity among the complexities as the target parking spot for parking the self-balancing vehicle.

15. The device of claim 14, wherein the processor is further configured to:
- control the self-balancing vehicle to be driven along a driving route having the minimum complexity to the target parking spot to park.

16. The device of claim 9, wherein the processor is further configured to:
- determine whether the self-balancing vehicle reaches the target parking spot;
- determine, by a balance device of the self-balancing vehicle, whether gravity center of the self-balancing vehicle has leaned against the target parking spot when it is determined that the self-balancing vehicle reaches the target parking spot; and
- control, when it is determined that the gravity center of the self-balancing vehicle has not leaned against the target parking spot, the self-balancing vehicle to perform a posture adjustment, and stop the posture adjustment when the gravity center of the self-balancing vehicle leans against the target parking spot such that the self-balancing vehicle parks at the target parking spot.

17. A non-transitory computer-readable storage medium having stored therein instructions that, when executed by a processor of a device, causes the device to perform a method for parking a self-balancing vehicle, the method comprising:
- determining whether there is a target parking spot for parking the self-balancing vehicle when the self-balancing vehicle needs to be parked; and
- controlling, when there is a target parking spot for parking the self-balancing vehicle, the self-balancing vehicle to park at the target parking spot,
- wherein determining whether there is the target parking spot for parking the self-balancing vehicle comprises:
  - controlling a body motor of the self-balancing vehicle to drive the self-balancing vehicle to move within a preset area at a preset speed;
  - controlling the self-balancing vehicle in a preset speed increase manner such that the speed of the self-balancing vehicle is increased to a preset speed threshold if the self-balancing vehicle detects an obstacle during movement within the preset area;
  - determining whether the self-balancing vehicle is able to go over the obstacle when it moves at the preset speed threshold; and determining the obstacle as the target parking spot for parking the self-balancing vehicle when it is determined that the self-balancing vehicle is not able to go over the obstacle.

\* \* \* \* \*